UNITED STATES PATENT OFFICE.

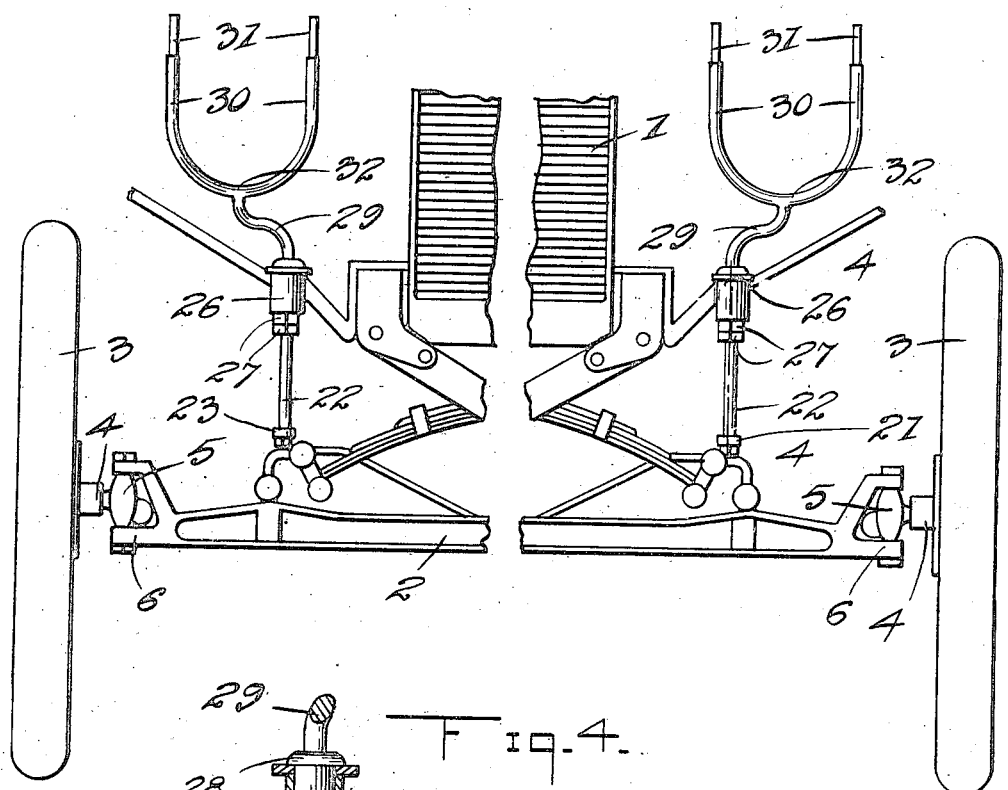

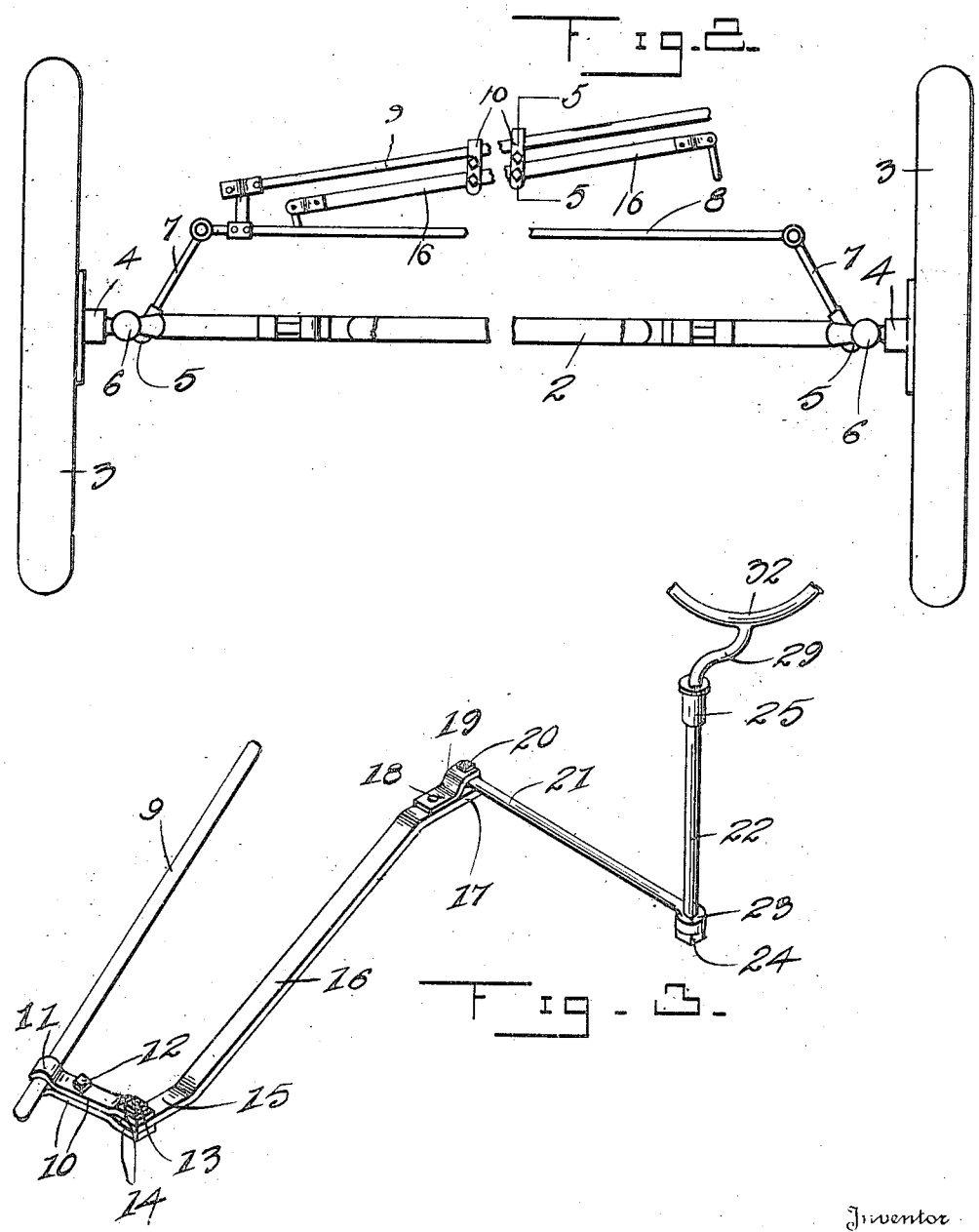

STARR V. MONSEES, OF SMITHTON, MISSOURI.

HEADLIGHT.

1,140,998. Specification of Letters Patent. Patented May 25, 1915.

Application filed October 12, 1914. Serial No. 866,352.

*To all whom it may concern:*

Be it known that I, STARR V. MONSEES, a citizen of the United States, residing at Smithton, in the county of Pettis and State of Missouri, have invented certain new and useful Improvements in Headlights; and I do hereby declare the following to be a full, clear, and exact description of the invention, such as will enable others skilled in the art to which it appertains to make and use the same.

This invention comprehends certain new and useful improvements in head lights for automobiles of the Ford type.

The invention has for its primary object to provide improved and novel means for supporting the head light of an automobile and connecting the supporting means to the steering rod so that the head light may be turned in either direction upon turning of the steering wheels or front wheels of the automobile.

The invention has for another object to provide supporting and automatic steering means for head lights which will be especially adapted for use on the Ford machine which may be constructed and arranged for use upon other types of automobiles and the like, if desired.

The invention has for a still further object to generally improve and simplify the construction and operation of head light supporting and steering means of this character and increase the efficiency thereof without materially increasing the cost of the same.

With the above and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a front elevation of an automobile of the Ford type with my head light supporting and steering mechanism applied thereto, portions of the automobile being broken away for the sake of clearness. Fig. 2 is a top plan view of the axle and steering rod for the same with my improved head light supporting and steering mechanism attached to the steering rod, Fig. 3 is an enlarged detail perspective view of the supporting and steering mechanism for one of the head lights, Fig. 4 is an enlarged detail fragmentary section on the plane of line 4—4 of Fig. 1, and Fig. 5 is a similar view on the plane of line 5—5 of Fig. 2.

Referring more particularly to the drawings wherein similar reference characters designate corresponding parts throughout the several views, and in which 1 designates in general an automobile having a front axle 2 with the wheels 3 mounted upon the spindles 4, the steering knuckles 5 of which are mounted in the bifurcated ends of the axle 2 in any suitable and well known manner, as shown at 6 and from which the steering members 5 extend the connecting links 7 which are connected by the rod 8, which is operated by a suitable steering rod 9 connected with said steering rod 8 and with a steering wheel or the link (not shown).

Removably engaged upon the steering rod 9 however, are clamp arms 10 which have their rear ends passed outwardly as shown at 11 for clamping engagement upon opposite sides of the steering rod 9, the clamp arms 10 of each pair being drawn together and held against movement, by means of a clamp bolt 12 while a pivot bolt 13 is passed through the face and out of the offset outer ends 14 of said clamp arms 10, the clamp bolt 12 also passing through the bent end 15 of an inclined connecting rod 16 engaged between the clamp arms 10. It will be understood that the clamp arms 10 extend forwardly from the steering rod 9 and as said steering rod 9 is moved in either direction to turn the spindles 4 to turn the vehicle in either direction, the clamp arms 10 will also be moved with the steering rod 9 and thereby cause movement of the inclined connecting rod 16 pivoted at the outer end of the pairs of clamp arms 10, the purpose of which will presently appear. It will be understood that the bent end 15 of each inclined connecting rod 16 and the steering rods 9 are horizontally alined and that the main portion of the connecting rod 16 is inclined upwardly and outwardly from said end 15 and has its upper end 17 also bent at an angle to the inclined or main portion of said connecting rod 16 and extended in a horizontal plane.

Secured upon the upper bent end 17 of each connecting rod 16 is a plate 18 which has its free end offset and extends parallel with and above the end 17, as shown at 19 with a pivot bolt 20 extended therethrough and through the tapered end 17 of the connecting rod 16 and also through the inner end of a turning rod 21 engaged between the end 17 and the offset end 19 of the plate 18 so that the turn rod 21 will be turned in the proper direction in a horizontal plane whereupon movement of the inclined connecting rod 16 owing to operation of the steering rod 9. The turn rod 21 extends at a right angle to the connecting rod 16 and has its outer end rigidly connected with the upstanding rod 22, as shown at 23. The upstanding rod 22 has a square portion adjacent its lower end upon which the forward end of the rod 21 is engaged as will be readily understood by referring to the drawing and said rod 21 is prevented from moving off of the lower end of the rod 22 by means of a lock nut 24 or the like threaded upon the lower extremity of said rod 22. The rod 22 also has an enlarged portion 25 adjacent its upper end which is engaged through the supporting bearing 26 such as found upon the Ford machine for supporting the stationary headlight support used on machines of this character. A pair of stop nuts 27 are threaded upon the rod 22 after the same has been inserted downwardly through the supporting bearing 26 with the uppermost stop nuts 27 bearing against the lower end of said supporting bearing 26. Downward movement of the rod 22 is limited by means of stop flange 28 formed around the same and directing upon the upper face of the supporting bearing 26 when said rod 22 is in position in the same. The end of the rod 22 above the supporting bearing 26 is reversely curved, as shown at 29 and terminates in the parallel upstanding headlight supporting arms 30 which have their upper ends reduced as shown at 31 so that a headlight of conventional form may be secured upon said arms 30. It will be understood that the lower ends of the arms 30 are curved toward one another and connected at the point at which said arms 30 connect with the reversely curved upper end 29 of the rod 22, as shown at 32.

It will be understood that the inclined connecting rods 16 are extended in opposite directions from the outer ends of the pairs of clamp arms 10 so that the headlight supported upon the arms will be turned in the proper direction to throw the light in front of the vehicle as the steering rod 9 is operated to turn the vehicle in either direction.

It will be understood that while I have constructed and arranged the parts of my headlight and supporting and gearing apparatus so that it will be especially adapted for use upon Ford automobiles, the parts may be arranged and constructed and connected in such manner as to adapt the mechanism for use upon automobiles and other vehicles of various types.

While the preferred embodiments of the invention have been shown and illustrated, it will be understood minor changes in the detail of construction and arrangement of parts may be made within the scope of the appended claims without departing from the spirit of the invention or sacrificing any of the advantages thereof.

What is claimed is:—

1. The combination with a steering rod and a turn rod of the head lights of a vehicle, of a connecting rod having its ends bent laterally in opposite direction, a plate provided with an offset end secured to one end of said connecting rod and securely holding the headlight turn rod positioned between the offset portion of the plate and the end of said connecting rod, and clamping arms having their ends offset to firmly secure the opposite end of the connecting rod to the steering rod when assembled.

2. A device of the class described comprising the combination with a steering rod and the turn rod of the head lights of a vehicle, of a connecting rod having its ends bent laterally in opposite directions, a plate secured on one end of said connecting rod adapted to secure one end of the turn rod between the connecting rod and the offset portion of said plate, and clamping arms having their ends offset and connected to the free end of said connecting rod and to the steering rod, and means for firmly clamping said arms in position.

In testimony whereof I affix my signature in presence of two witnesses.

STARR V. MONSEES.

Witnesses:
S. C. KAHRS,
C. A. SELKEN.